United States Patent
Banik et al.

(10) Patent No.: US 12,536,808 B2
(45) Date of Patent: Jan. 27, 2026

(54) VEHICLE IN-CABIN LEARNING EXPERIENCE USING AUGMENTED REALITY

(71) Applicant: Harman International Industries, Incorporated, Stamford, CT (US)

(72) Inventors: Ananya Banik, Karnataka (IN); Sanjay Saini, Karnataka (IN); Ravinder Pal Singh, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 94 days.

(21) Appl. No.: 18/461,393

(22) Filed: Sep. 5, 2023

(65) Prior Publication Data
US 2025/0078518 A1 Mar. 6, 2025

(51) Int. Cl.
*G06V 20/56* (2022.01)
*G06F 3/01* (2006.01)
(Continued)

(52) U.S. Cl.
CPC .............. *G06V 20/56* (2022.01); *G06F 3/013* (2013.01); *G06T 3/60* (2013.01); *G06T 7/12* (2017.01);
(Continued)

(58) Field of Classification Search
CPC .... G06V 20/56; G06V 2201/07; G06F 3/013; G06T 3/60; G06T 7/12; G06T 19/006; G09G 5/377
See application file for complete search history.

(56) References Cited

U.S. PATENT DOCUMENTS 11,900,672 B2 * 2/2024 Lin .................. G06V 40/28
2019/0355178 A1 * 11/2019 Hermina Martinez .................
G06V 20/593
(Continued)

FOREIGN PATENT DOCUMENTS

CN 114115656 A 3/2022
CN 118330882 A * 7/2024 ............. B60K 35/00
(Continued)

OTHER PUBLICATIONS

Siang, L., "The Object Recognition for Augmented Reality (AR)," Bachelor of Information Technology (Honours) Communications and Networking Thesis, Universiti Tunki Abdul Rahman, School of Information and Communication Technology, Kampar Campus, Jan. 2023, 112 pages.

(Continued)

*Primary Examiner* — Tracy Y. Li
(74) *Attorney, Agent, or Firm* — McCoy Russell LLP

(57) ABSTRACT

The current disclosure provides systems and methods for allowing passengers of a vehicle to interact with a surrounding environment in educational and entertaining ways, using an augmented reality (AR) touchscreen window. The passenger may select an element of the surrounding environment by touching a location of the element on the AR window. An image of the element may be captured and displayed in a portion of the AR window, along with information about the element retrieved from the Internet. The passenger can select the image using the touchscreen of the AR window to view an Internet browser with additional information about the selected element. Additionally, the passenger can edit the information and/or add further annotations, attach additional images, audio and/or video clips, etc. to generate a mixed-media content that can be shared or stored in a cloud-based storage to be reviewed at a later time.

20 Claims, 7 Drawing Sheets

(51) Int. Cl.
   *G06T 3/60*   (2024.01)
   *G06T 7/12*   (2017.01)
   *G06T 19/00*   (2011.01)
   *G09G 5/377*   (2006.01)

(52) U.S. Cl.
   CPC ........... *G06T 19/006* (2013.01); *G09G 5/377* (2013.01); *G06V 2201/07* (2022.01)

(56) References Cited

U.S. PATENT DOCUMENTS

| | | | |
|---|---|---|---|
| 2021/0023946 A1* | 1/2021 | Johnson | B60K 35/00 |
| 2021/0394793 A1* | 12/2021 | Austin | G08G 1/0112 |
| 2023/0316769 A1* | 10/2023 | Hashimoto | B60W 40/08 |
| | | | 348/148 |
| 2025/0046019 A1* | 2/2025 | Rakshit | G08G 1/166 |
| 2025/0063330 A1* | 2/2025 | Roy | B60Q 1/543 |

FOREIGN PATENT DOCUMENTS

| | | | | |
|---|---|---|---|---|
| EP | 2420941 A1 | | 2/2012 | |
| EP | 4167054 A1 * | | 4/2023 | ............. B60K 35/00 |
| WO | WO-2018229552 A2 * | | 12/2018 | ........... B60W 60/001 |

OTHER PUBLICATIONS

European Patent Office, Extended European Search Report Issued in Application No. 24196983.1, Dec. 23, 2024, Germany, 11 pages.

\* cited by examiner

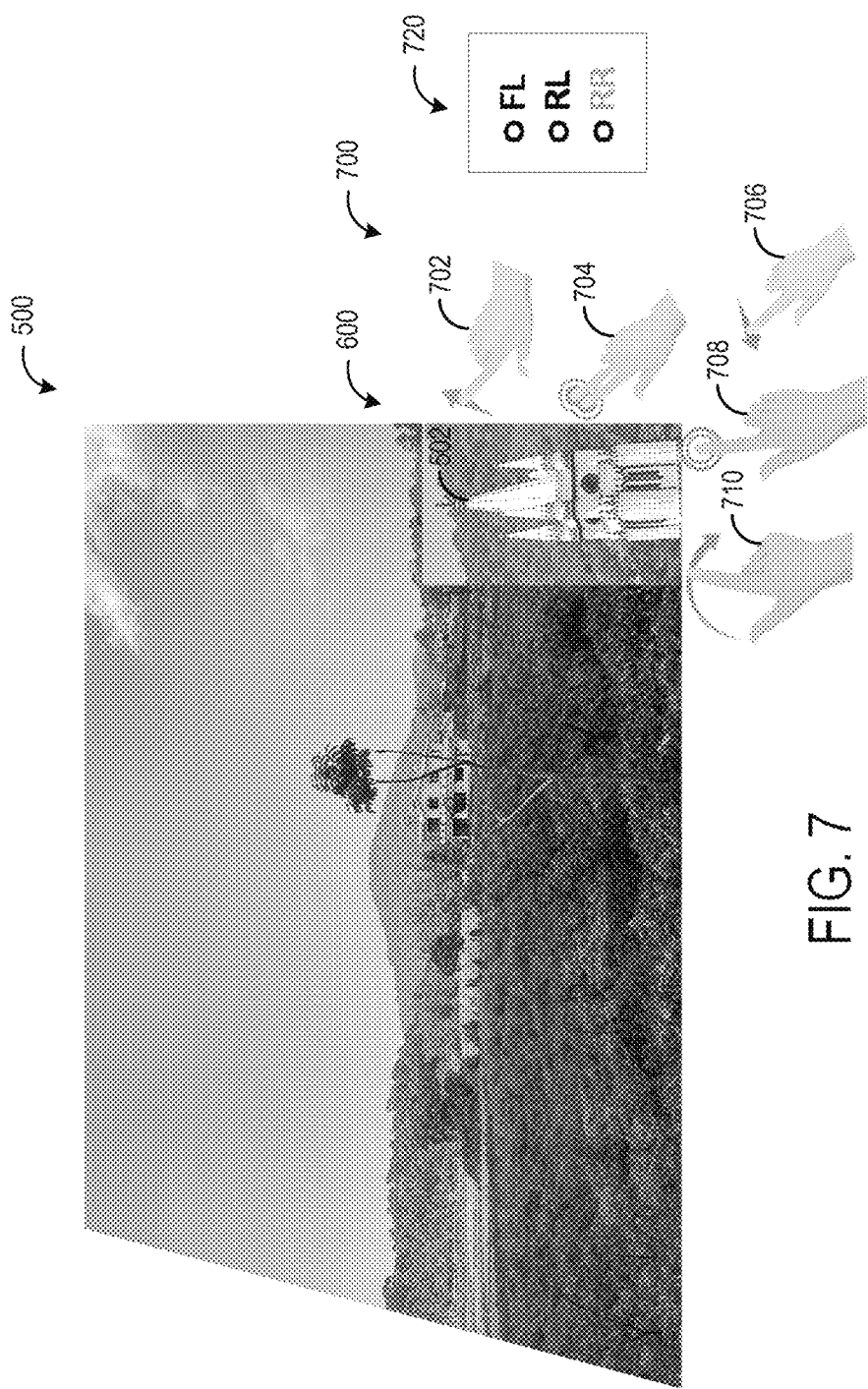

VEHICLE IN-CABIN LEARNING EXPERIENCE USING AUGMENTED REALITY

TECHNICAL FIELD

Embodiments of the subject matter disclosed herein relate to augmented reality and virtual reality presentations generated for occupants of a vehicle.

BACKGROUND

Traffic congestion and long vehicle journeys may make an experience of occupants of a vehicle tedious and boring due to no interactive activity inside the car. Occupants may rely on using various gadgets like a tablet, smart phone, etc. for entertainment which may hinder occupant health, especially in case of kids. The occupants may see interesting elements of a surrounding environment, but there is currently no way to learn more about the elements within a short time frame (e.g., while passing by in a vehicle). An occupant may see destinations that would be interesting to visit, and may wish to create a travel plan to a destination. However, planning travel to the destination may entail searching on the Internet or viewing a physical travel guide, which may be cumbersome while riding in a vehicle.

SUMMARY

The current disclosure at least partially addresses one or more of the above identified issues by a method for a computing system of a vehicle, the method comprising, in response to a passenger of the vehicle selecting an element of a surrounding environment of the vehicle, the element visible through a window of the vehicle by the passenger while the vehicle is moving, capturing a first image of the surrounding environment including the element via one or more cameras of the vehicle; identifying the element of the first image; retrieving information about the element from the Internet; and displaying a second image of the element and the retrieved information about the element on the window. The window may be an augmented reality (AR) window including a touchscreen portion, where the passenger can select the element by touching a location of the element on the AR window. After the second image is displayed on the window, the passenger can select the second image using the touchscreen to view an Internet browser with additional information (e.g., search results) about the selected element. Additionally, the passenger can edit the information and/or add further annotations, attach additional images, audio and/or video clips to the second image. The second image and associated content can be stored in a database of the vehicle and/or in a cloud-based storage to be reviewed at a later time. The second image and associated content can also be shared with other passengers of the vehicle. For example, a first passenger can request to send the second image and associated content to a second passenger. The computing system may display the request on a second AR window of the second passenger. The second passenger may accept the request, and the second image and associated content may be displayed on the second AR window.

In this way, passengers of the vehicle may interact with the surrounding environment in a manner that is entertaining and educational. Children can learn about things that they see on trips with the vehicle, and share what they learn with others. Adults can plan future trips and save the plans in a customized travel planner for future reference. Passengers of all ages can document their trips in multimedia travel journals or albums, saving images and information collected along the journeys for reviewing and/or sharing later.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 7 is a third example of an AR display of information relating to the surrounding environment displayed on a window of a vehicle, according to one or more embodiments of the disclosure.

Figure 1:
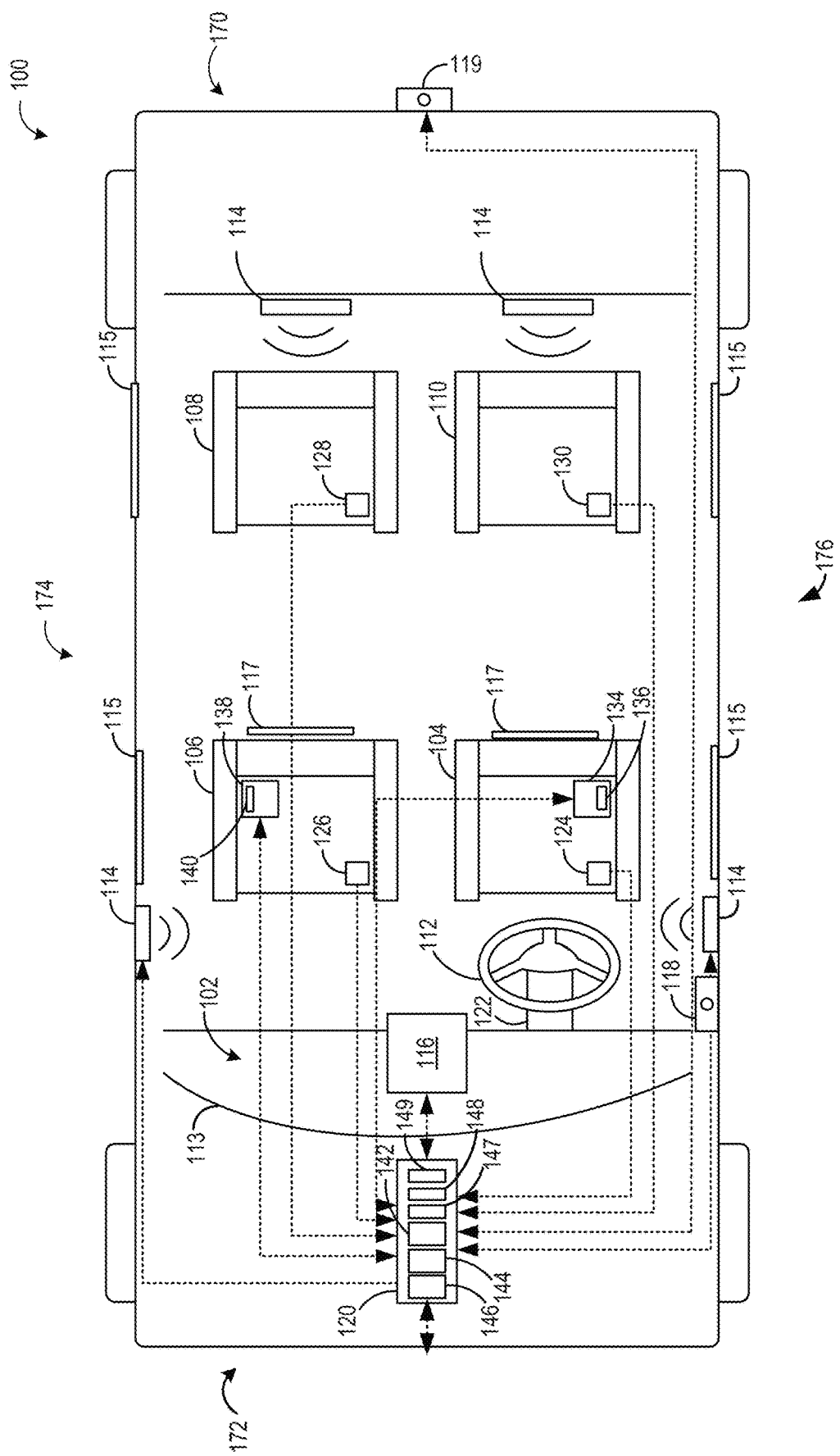
FIG. 1 is a schematic diagram of a vehicle, according to one or more embodiments of the disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems, and methods.

DETAILED DESCRIPTION

A vehicle may include various systems for monitoring internal and external environments of the vehicle, and communicating information to a driver of the vehicle based on the monitored internal and external environments. As one example, Advanced Driver Assistance Systems (ADAS) are developed to adapt and enhance operation of vehicles to increase quality of driving and the driving experience. An ADAS monitors an inside and outside environment of vehicle using various types of sensors, such as camera, lidar, radar, and ultrasonic sensors. The sensor data may be processed by an in-vehicle computing system to extract information regarding the vehicle operator/occupant(s), and communicate the information to the operator and/or implement actions based on the information. The actions may include alerting the operator via an audio or visual notification, or controlling the throttle, brake, or steering of the vehicle.

The ADAS may rely on a Driver Monitoring System (DMS) and/or an Occupant Monitoring System (OMS). The DMS includes a set of advanced safety features that applies output from in-cabin sensors (including cameras) to detect and track a physical state (e.g., vehicle operator experiencing drowsiness) or mental state (e.g., vehicle operator is distracted) of the operator/driver. Further, the DMS may alert the vehicle operator when the vehicle operator is experiencing physical states or mental states that are not suitable for operation of the vehicle. In comparison with the DMS, the OMS may monitor an entirety of an in-cabin environment. The OMS includes features such as seat belt detection, smart airbag deployment, left object warning, and forgotten child warning.

The ADAS, DMS, and OMS systems are typically oriented towards information of use to the operator (e.g., driver), for example, to increase a safety of the operator and occupants of the vehicle and/or to increase a driving performance of the operator. The ADAS, DMS, and OMS systems may not provide information to passengers of the vehicle. In some cases, back seat passengers of the vehicle may access information for education or entertainment purposes via a Rear-seat Entertainment system (RSE), where the back seat passengers may interact with a touchscreen of the RSE to view video content, browse the Internet, etc. However, the RSE system may not be integrated with the ADAS, DMS, OMS, and/or internal/external cameras of the vehicle, where video data captured by the internal/external cameras and/or processed by the ADAS, DMS, and OMS systems may not be available via the RSE system.

Information about the surrounding environment may be of interest to passengers of the vehicle for various reasons. During journeys, in particular long journeys or in high congestion situations, the passengers may look out windows of the vehicle and may wish to learn more about an element of the surrounding environment, such as a geographical feature, natural park, historical building, museum, etc. For example, a passenger may see a mountain, and may wish to know a name, height, or other data of the mountain; the passenger may see a tourist attraction, and may wish to know information about visiting the tourist attraction; the passenger may see a monument, and may wish to learn about a history of the monument; and so on.

Currently, the passenger may access such information via a personal computing device, such as a smart phone or a tablet computer. In some embodiments, such information may additionally or alternatively be available to the passenger via the RSE. However, accessing the information may include performing a search on the element of the surrounding environment in an Internet browser. Performing the search may entail entering information manually via a touchscreen of the device or RSE; waiting for a response; searching through links returned by the search and filtering information; reading entries to determine a suitability or desirability of the information; and so on. As a result, getting the information about the element of the surrounding environment may be cumbersome and/or time consuming.

Additionally, retrieving information about the element may be difficult while the vehicle is moving. By the time the information is retrieved, the element of the surrounding environment may no longer be visible through the window, and the passenger may lose interest. Further, when the passenger is a child, the child may not be sufficiently educated or skilled to retrieve desired information. Further still, using the personal computing device may entail looking away from the window, and excessive use of a handheld device may be unhealthy for the passenger's posture, eyesight, or mental state.

To address this issue, systems and methods are proposed herein for an in-vehicle augmented reality (AR) system that processes image data captured at one or more cameras of the vehicle (e.g., external cameras), and displays information about elements of the surrounding environment on a surface of a window of the vehicle. The information may be automatically generated, or generated based on a user interaction. For example, in various embodiments, the window may include a touchscreen portion, and the passenger may select a feature in the surrounding environment by touching a location of the feature on the touchscreen portion (e.g., the surface of the window). With the aid of one or more machine learning (ML) models, the AR system may process image data from the one or more cameras to determine the selected feature, retrieve information related to the selected feature from the Internet, filter the information, and display (e.g., project) the information on the surface of the window. The displayed information may be positioned or arranged on the surface of the window such that the information may be viewed concurrently with the feature of the environment. The displayed information may be generated and displayed in real time.

In this way, riding in the vehicle may be converted into a learning experience, where the passenger may learn about elements of the surrounding environment in a fun, easy, gamified way. Additionally, in various embodiments, the passenger may interact with the displayed information, by adding relevant information, editing the information, and/or sharing the information with other passengers of the vehicle.

Figure 2:
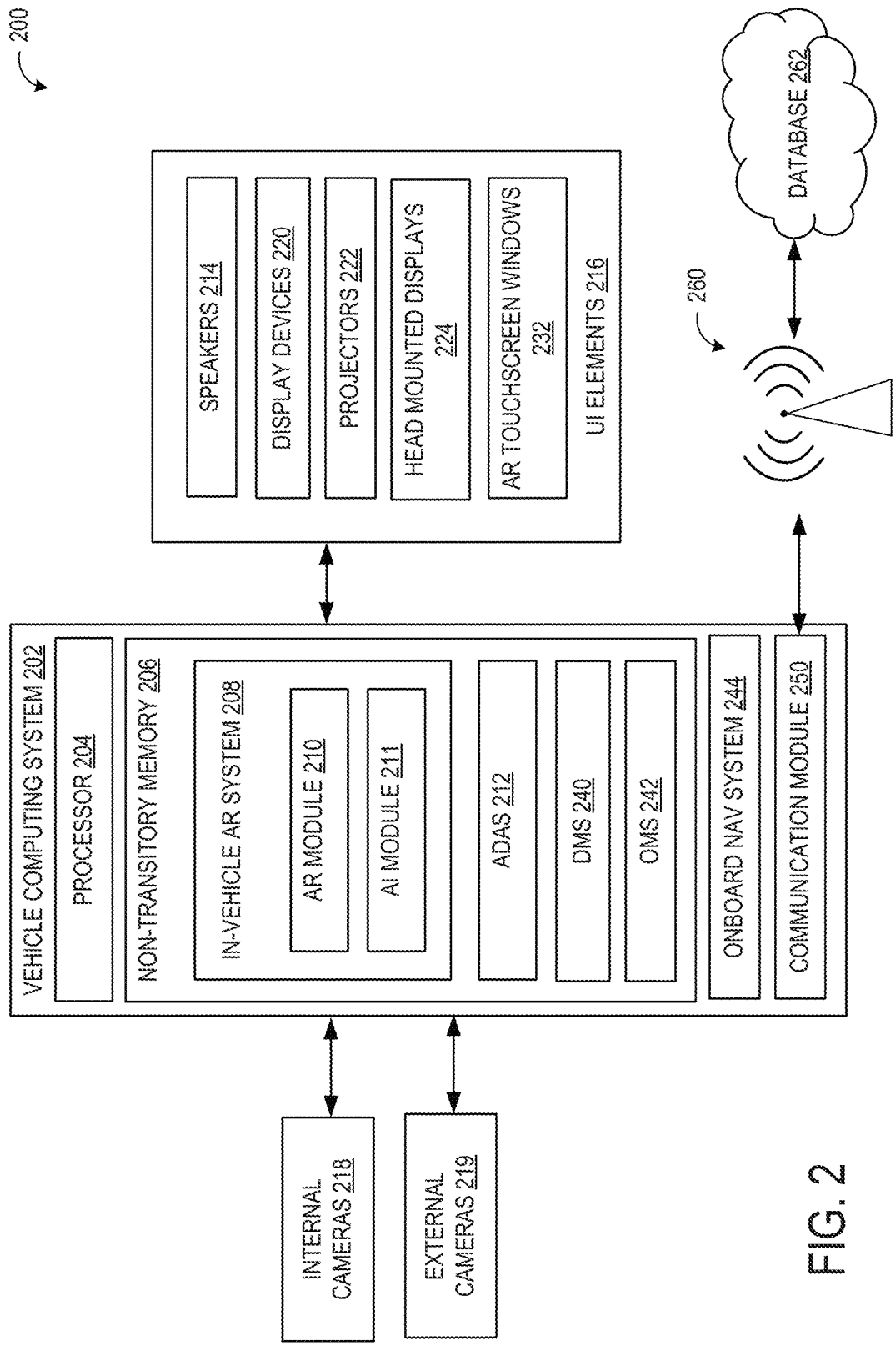
FIG. 2 shows a block diagram of an exemplary embodiment of a vehicle computing system, according to one or more embodiments of the disclosure.
Figure 5:
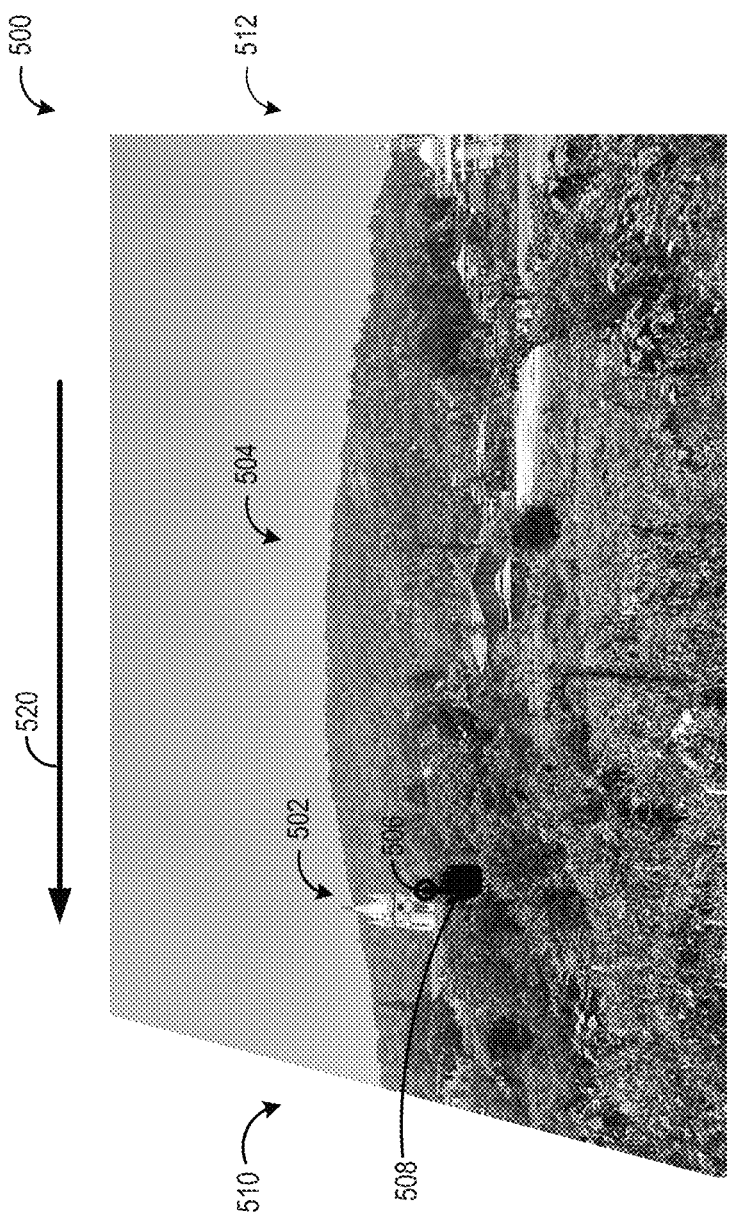
FIG. 5 is a first example of an AR display of information relating to the surrounding environment displayed on a window of a vehicle, according to one or more embodiments of the disclosure.
Figure 6:
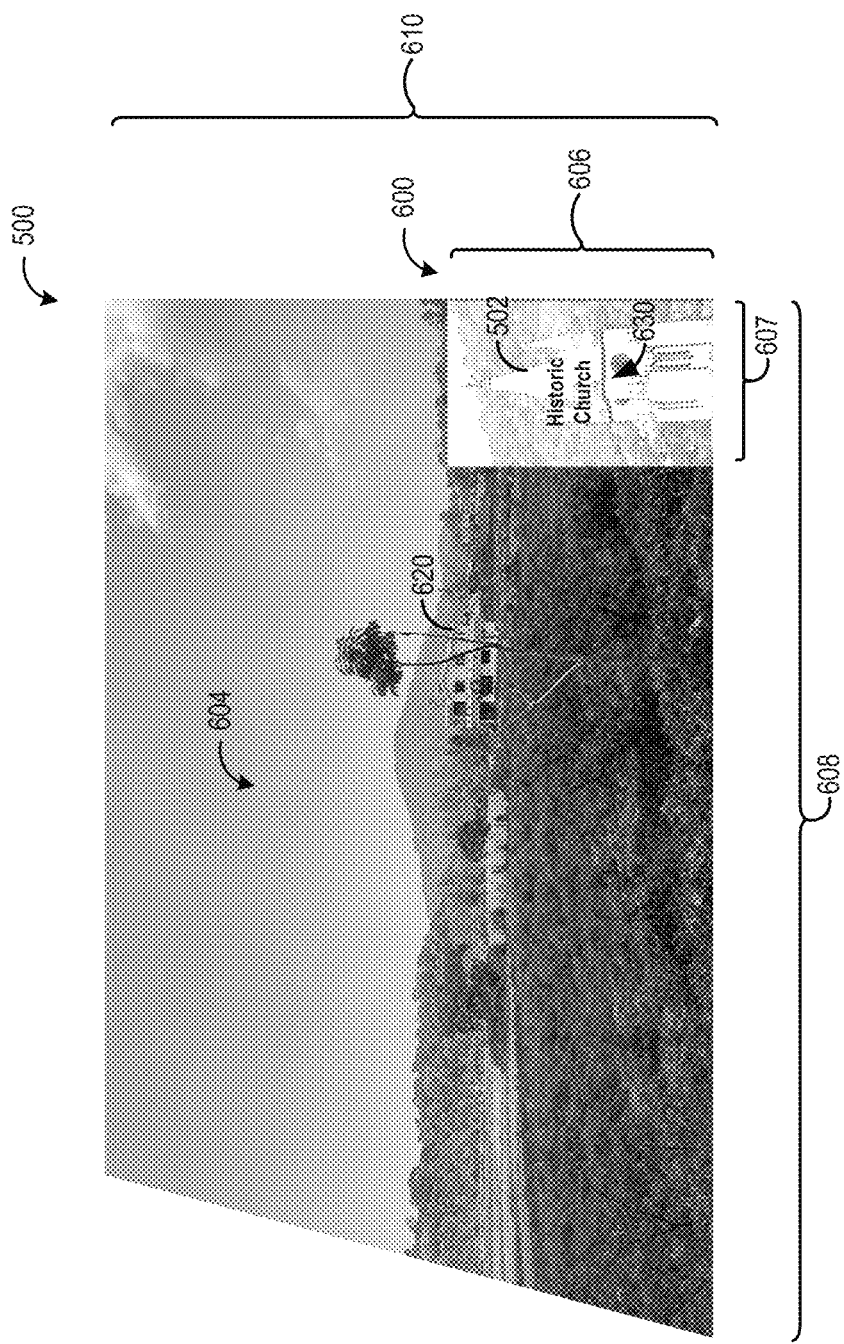
FIG. 6 is a second example of an AR display of information relating to the surrounding environment displayed on a window of a vehicle, according to one or more embodiments of the disclosure.

An exemplary vehicle is shown in FIG. 1. A schematic diagram of a computing system of the vehicle including an in-vehicle AR system is shown in FIG. 2. An occupant of the vehicle may interact with the in-vehicle AR system by touching an AR touchscreen window, as shown in FIG. 5. In response to the occupant selecting an element of a surrounding environment of the vehicle via the AR touchscreen window, the computing system may retrieve images from a plurality of cameras of the vehicle, and process the images to determine whether the selected element is a high-priority element relevant to operating the vehicle, by following one or more steps of the method of FIG. 3. If the selected element is a lower-priority feature (e.g., not a high-priority feature), educational or entertaining information related to the selected element may be generated and displayed to a passenger by following one or more steps of the method of FIG. 4. The educational or entertaining information relating to the selected element may be projected on a surface of a window of the vehicle, as shown in FIG. 6. The passenger may manipulate, learn more about, dismiss, and/or share the educational or entertaining information via the AR touchscreen window, as shown in FIG. 7.

Turning now to the figures, FIG. 1 schematically shows an exemplary vehicle 100. The vehicle 100 includes a dashboard 102, a driver seat 104, a first passenger seat 106, a second passenger seat 108, and a third passenger seat 110. In other examples, the vehicle 100 may include more or fewer passenger seats. The driver seat 104 and the first passenger seat 106 are located in a front of the vehicle, proximate to the dashboard 102, and therefore may be referred to as front seats. The second passenger seat 108 and the third passenger seat 110 are located at a rear of the vehicle and may be referred to as back (or rear) seats.

Vehicle 100 includes a plurality of integrated speakers 114, which may be arranged around a periphery of the vehicle 100. In some embodiments, the integrated speakers 114 are electronically coupled to an electronic control system of the vehicle, such as to a computing system 120, via a wired connection. In other embodiments, the integrated speakers 114 may wirelessly communicate with the computing system 120. As an example, an audio file may be generated by computing system 120 or selected by an occupant of the vehicle 100, and the selected audio file may be played at one or more of the integrated speakers 114. In some examples, audio alerts may be generated by the computing system 120 and also may be played at the integrated speakers 114. In some embodiments, audio files, signals, and/or alerts may be selected by or generated for an occupant of vehicle 100, and may be played an integrated speaker 114 associated with and/or proximal to a seat of the occupant. Further, in some embodiments, audio files, signals, and/or alerts selected by or generated for the occupant may be played at an integrated speaker 114 associated with and/or proximal to a seat of one or more other occupants of vehicle 100.

The vehicle 100 includes a steering wheel 112 and a steering column 122, through which the driver may input steering commands for the vehicle 100. The vehicle 100 further includes one or more cameras 118, which may be directed at respective occupants of the vehicle. In the embodiment shown in FIG. 1, a camera 118 is positioned to the side of the driver seat 104, which may aid in monitoring the driver in profile. However, in other examples, the one or more cameras 118 may be positioned in other locations in the vehicle, such as on the steering column 122, directly in front of the driver seat 104 and/or to the side of or directly in front of passenger seats 106, 108, and 110. The one or more cameras 118 may be arranged such that all of the occupants are captured collectively by the one or more cameras 118.

Additionally, in the embodiment shown in FIG. 1, one or more cameras 119 may be positioned on an exterior of the vehicle 100, which may capture images of a surrounding environment of vehicle 100 and aid in monitoring a position of vehicle 100 in a lane and/or monitor the position of the vehicle 100 relative to other vehicles and/or the surrounding environment. While camera 119 is depicted in FIG. 1 at a back end 170 of vehicle 100, it should be appreciated that one or more cameras 119 may be positioned at other locations on the exterior of vehicle 100. For example, a first camera 119 may be positioned at back end 170 of vehicle 100; a second camera 119 may be positioned at a front end 172 of vehicle 100; a third camera 119 may be positioned at a right side 174 of vehicle 100; and a fourth camera 119 may be positioned at a left side 176 of vehicle 100. In some examples, cameras 119 may be located in side mirrors of vehicle 100. In some embodiments, a plurality of cameras 119 may be arranged on each of one or more sides of vehicle 100. Additionally or alternatively, in some embodiments, the one or more cameras 119 may be positioned at various locations inside vehicle 100 and directed outward from vehicle 100 at the surrounding environment, for example, through various windows of the vehicle. The one or more cameras 119 may be arranged such that a 360 degree view of the surrounding environment is captured collectively by the one or more cameras 119.

The vehicle 100 may further include a driver seat sensor 124 coupled to or within the driver seat 104 and a passenger seat sensor 126 coupled to or within the first passenger seat 106. The back seats may also include seat sensors, such as a passenger seat sensor 128 coupled to the second passenger seat 108 and a passenger seat sensor 130 coupled to the third passenger seat 110. The driver seat sensor 124 and the passenger seat sensor 126 may each include one or a plurality of sensors, such as a weight sensor, a pressure sensor, and one or more seat position sensors that output a measurement signal to the computing system 120. For example, the output of the weight sensor or pressure sensor may be used by the computing system 120 to determine whether or not the respective seat is occupied, and if occupied, a weight of a person occupying the seat. As another example, the output of the one or more seat position sensors may be used by the computing system 120 to determine one or more of an occupant of vehicle 100, a seat height, a longitudinal position with respect to the dashboard 102 and the back seats, and an angle (e.g., tilt) of a seat back of a corresponding seat.

In some examples, vehicle 100 further includes a driver seat motor 134 coupled to or positioned within the driver seat 104 and a passenger seat motor 138 coupled to or positioned within the first passenger seat 106. Although not shown, in some embodiments, the back seats may also include seat motors. The driver seat motor 134 may be used to adjust the seat position, including the seat height, the longitudinal seat position, and the angle of the seat back of the driver seat 104 and may include an adjustment input 136. For example, the adjustment input 136 may include one or more toggles, buttons, and switches. The passenger seat motor 138 may be used to adjust the seat position, including the seat height, the longitudinal seat position, and the angle of the seat back of the first passenger seat 106 and may include an adjustment input 140, the adjustment input 140 may include one or more toggles, buttons, and switches. Although not shown, in some embodiments, the back seats may be adjustable in a similar manner.

Computing system 120 may include a user interface (UI) 116. Computing system 120 may receive inputs via UI 116 as well as output information to UI 116. The user interface 116 may be included in a digital cockpit, for example, and may include a display and one or more input devices. The one or more input devices may include one or more touchscreens, knobs, dials, hard buttons, and soft buttons for receiving user input from a vehicle occupant. UI 116 may include a display screen on which information, images, videos, and the like may be displayed. The display screen may be a touchscreen, and an occupant of vehicle 100 may interact with UI 116 via control elements displayed on the display screen. In some embodiments, UI 116 may additionally or alternatively display or project the information, images, videos, and the like on a windshield 113 of vehicle 100. Further, in some embodiments, different visual content may be generated and displayed on different display screens of the dashboard, or at different locations of windshield 113, such that the driver may view a first set of visual content, and a front seat passenger of vehicle 100 may view a second, different set of visual content. For example, the first set of visual content may be relevant to operating the vehicle, and the second set of visual content may not be relevant to operating the vehicle.

Computing system 120 may include one or more additional UIs 117, which may be positioned at locations accessible to back seat passengers of vehicle 100. In various embodiments, the one or more additional UIs 117 may comprise or be comprised by an RSE system. In other words, a first UI 117 may be positioned on a rear side of front seat 106, such that a first rear passenger sitting in rear seat 108 may interact with the first UI 117. A second UI 117 may be positioned on a rear side of driver's seat 104, such that a second rear passenger sitting in rear seat 110 may interact with the second UI 117. In vehicles including additional rear seats, additional UIs 117 may be arranged similarly such that each occupant of vehicle 100 may interact with a UI 117.

Each additional UI 117 may include the same or similar features included in UI 116, such as physical and/or virtual control elements, one or more display screens, etc. Additionally, each additional UI 117 may be configured to receive the same or different video and/or audio content from computing system 120 and display the content independently of other UI 117*s*. For example, computing system 120 may generate a first set of visual content on a first display screen associated with first UI 117; a second, different set of visual content on a second display screen associated with second UI 117; a third, different set of visual content on a third display screen associated with third UI 117; and so on. Similarly, a first occupant of vehicle 100 may interact with a first UI 117 to generate a first set of visual content on a first display screen associated with first UI 117; a second occupant of vehicle 100 may interact with a second UI 117 to generate a second, different set of visual content on a second display screen associated with second UI 117; a third occupant of vehicle 100 may interact with a third UI 117 to generate a third, different set of visual content on a third display screen associated with third UI 117; and so on. The sets of visual content may include associated audio content, which may be played at a respective speaker 114.

Further, in various embodiments, each UI 117 may additionally or alternatively be positioned at, in, or on a window of vehicle 100, and each UI 117 may be configured to project visual content on the window. In particular, the visual content may be projected to generate an AR display in conjunction with elements of the surrounding environment. For example, in the embodiment depicted in FIG. 1, vehicle 100 includes four AR touchscreen windows 115 on right side 174 and left side 176 of the vehicle, which may also be UIs 117. In other embodiments, a greater or lesser number of AR touchscreen windows 115 may be included in vehicle 100. In some embodiments, all side windows of vehicle 100 may be AR touchscreen windows. In other embodiments, a portion of the side windows of vehicle 100 may be AR touchscreen windows. Each AR touchscreen window 115 may include a touchscreen portion on which objects and information may be displayed, where a user may interact with the objects and information by touching portions of the touchscreen corresponding to the objects and information.

Each AR touchscreen window 115 may be configured to display or project visual content on the respective AR touchscreen window 115. In particular, as described in greater detail below, each AR touchscreen window 115 may be configured to display on the respective side window (and/or display screen of the UI 117) information about the surrounding environment captured via the one or more cameras 119. The information may include, for example, text, images, and/or videos relating to elements of the surrounding environment.

For example, when driving through an urban environment, an occupant may select a city landmark visible through the respective AR touchscreen window 115 via a touchscreen of AR touchscreen window 115. An image of the city landmark may be captured by one or more cameras 119 of the vehicle and displayed on a portion of the respective AR touchscreen window 115. Computing system 120 may identify the city landmark in real time, and retrieve information regarding the city landmark from the Internet. The information may be displayed to the occupant within the selected image.

Further, in various embodiments, the additional AR touchscreen may be configured to deliver visual content and/or audio content at one or more other AR touchscreen windows 115 and/or other UIs 117. For example, the first occupant may select a first element of the surrounding environment via first AR touchscreen window 115, and display the first visual content on one or more of AR touchscreen windows 115 of other occupants of vehicle 100, and/or display screens associated with other UIs 117. In this way, occupants of vehicle 100 may share information about a portion of the surrounding environment with other occupants of vehicle 100.

For example, a first occupant of rear seat 108 may see a feature of the surrounding environment, such as a mountain, through a first AR touchscreen window 115 on right side 174 of vehicle 100. The first occupant may select the mountain by touching a touchscreen portion of first AR touchscreen window 115. Information about the mountain may be generated by computing system 120 and projected on the first AR touchscreen window 115, such that the first occupant may view the information while viewing the mountain. For example, when the first occupant selects the mountain, an image of the mountain may be generated and "frozen" on a portion of the window, and the information may be displayed next to or around the mountain in the image.

The first occupant may find the information interesting, and may wish to share the image from the first AR touchscreen window 115 and the information with a second occupant of rear seat 110. The first occupant may edit, annotate, or add an audio clip to the image. The first occupant may send the image and associated content to a second AR touchscreen window or UI 117 of the second occupant. In this way, occupants of the vehicle may learn about elements of the surrounding environment, and share what they learn with occupants sitting in other seats.

Computing system 120 includes a processor 142 configured to execute machine readable instructions stored in a memory 144. The processor 142 may be single core or multi-core, and the programs executed by processor 142 may be configured for parallel or distributed processing. In some embodiments, the processor 142 is a microcontroller. The processor 142 may optionally include individual components that are distributed throughout two or more devices, which may be remotely located and/or configured for coordinated processing. In some embodiments, one or more aspects of the processor 142 may be virtualized and executed by remotely-accessible networked computing devices configured in a cloud computing configuration. For example, the computing system 120 may be communicatively coupled with a wireless network.

Computing system 120 may include a DMS 147, which may monitor a driver of the vehicle 100. For example, the camera 118 may be located at the front of the vehicle 100 (e.g., on dashboard 102) or on a side of the vehicle 100 next to the driver seat 104, and may be positioned to view a face of the driver. The DMS may detect facial features of the driver. In some embodiments, the DMS 147 may be used to retrieve a driver profile of the driver based on the facial features, which may be used to customize a position of the driver seat 104, steering wheel 112, and/or other components or software of the vehicle 100.

Computing system 120 may include an OMS 148, which may monitor one or more passengers of the vehicle 100. For example, the camera 118 may be located at a side of the vehicle 100 next to one or more of passenger seats 106, 108, and 110, and may be positioned to view a face of a passenger of the vehicle.

Computing system 120 may include an ADAS 149, which may provide assistance to the driver based at least partially on the DMS 147. For example, ADAS 149 may receive data from DMS 147, and the ADAS 149 may process the data to provide the assistance to the driver. Computing system 120 and ADAS 149 may additionally include one or more artificial intelligence (AI) and/or machine learning (ML)/deep learning (DL) models, which may be used to perform various automated tasks related to image data captured by cameras 118 and 119. In particular, the AI/ML/DL models may be used to select and generate information to selectively display at display screens and/or project on windows of one or more occupants of vehicle 100, as described in greater detail below. For example, a first ML model of ADAS 149 may selectively display information relevant to operating vehicle 100 to a display screen of the driver, or on a portion of windshield 113 near the driver, and a second ML model of computing system 120 (e.g., the in-vehicle AR system) may selectively display educational and/or entertainment information on a display screen or window of one or more passengers of vehicle 100.

Computing system 120 may communicate with networked computing devices via short-range communication protocols, such as Bluetooth®. In some embodiments, the computing system 120 may include other electronic components capable of carrying out processing functions, such as a digital signal processor, a field-programmable gate array (FPGA), or a graphic board. In some embodiments, the processor 142 may include multiple electronic components capable of carrying out processing functions. For example, the processor 142 may include two or more electronic components selected from a plurality of possible electronic components, including a central processor, a digital signal processor, a field-programmable gate array, and a graphics board. In still further embodiments, the processor 142 may be configured as a graphical processing unit (GPU), including parallel computing architecture and parallel processing capabilities.

Further, the memory 144 may include any non-transitory tangible computer readable medium in which programming instructions are stored. As used herein, the term "tangible computer readable medium" is expressly defined to include any type of computer readable storage. The example methods described herein may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information).

Computer memory of computer readable storage mediums as referenced herein may include volatile and non-volatile or removable and non-removable media for a storage of electronically formatted information, such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device. In various embodiments, the memory 144 may include an SD memory card, an internal and/or external hard disk, USB memory device, or a similar modular memory.

Further still, in some examples, the computing system 120 may include a plurality of sub-systems or modules tasks with performing specific functions related to performing image acquisition and analysis. As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

Referring now to FIG. 2, a block diagram 200 shows an example of a vehicle computing system 202 of a vehicle, which may be a non-limiting example of computing system 120 described above in reference to vehicle 100 of FIG. 1. Vehicle computing system 202 may be communicatively coupled to one or more internal cameras 218 of the vehicle (e.g., the one or more cameras 118), and one or more external cameras 219 of the vehicle (e.g., the one or more cameras 119). Internal cameras 218 and external cameras 219 may provide image data to vehicle computing system 202.

Computing system 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 includes an in-vehicle AR system 208, which may manage a generation of visual and audio content to occupants of the vehicle, as described above in reference to FIG. 1. In particular, in-vehicle AR system 208 may include an AR module 210, which may generate and project visual content on one or more windows of the vehicle for the occupants to view in conjunction with elements of a surrounding environment of the vehicle. In-vehicle AR system 208 may include instructions that, when executed by processor 204, cause vehicle computing system 202 to conduct one or more of the steps of method 400, described in greater detail below in reference to FIG. 4.

Content management module may additionally store an AI module 211, which may include one or more AI models, and instructions for implementing the one or more one or more AI models, as described in greater detail below. The one or more AI models may be ML or DL neural network models. AI module 211 may include trained and/or untrained neural networks and may further include various data or metadata pertaining to the one or more neural networks stored therein. AI module 211 may also include other types of statistical, rules-based, or other models. AI module 211 may include instructions for implementing one or more gradient descent algorithms, applying one or more loss functions, and/or training routines, for use in adjusting parameters of one or more neural networks of AI module 211. AI module 211 may include training datasets for the one or more AI models of AI module 211. AI module 211 may include instructions for deploying one or more trained AI models. Additionally, AI module 211 may include instructions that, when executed by processor 204, cause vehicle computing system 202 to conduct one or more of the steps of method 300, described in greater detail below in reference to FIG. 3.

It may be understood that in some examples, in-vehicle AR system 208 may be additionally or alternatively accessed via a user-provided mobile computing system, such as a smartphone, computer, or tablet. In-vehicle AR system 208 may additionally or alternatively be included in a networked computing system such as a cloud computer or a similar computing environment and accessed remotely (e.g., via a wireless network, such as the wireless network 132 shown in FIG. 1). As such, although in-vehicle AR system 208 is shown within vehicle computing system 202 in FIG. 2, in other embodiments, at least portions of in-vehicle AR system 208 may be stored in computing devices and/or networks outside of vehicle computing system 202 that are communicatively coupled to vehicle computing system 202.

Vehicle computing system 202 may be coupled to various UI elements 216, which may include one or more speakers 214, one or more display devices 220, one or more projectors 222, one or more head-mounted displays 224, and one or more AR touchscreen windows 232. UI elements 216 may include non-limiting examples of AR touchscreen windows 115, UI 116, and/or UI 117 of vehicle 100 of FIG. 1. As such, the one or more speakers 214 may be the same as or similar to speakers 114, and AR touchscreen windows 232 may be the same as or similar to AR touchscreen windows 115.

The one or more display devices 220 and the one or more projectors 222 may be used to display visual content to occupants of the vehicle. The one or more display devices 220 may include one or more display screens utilizing virtually any type of technology. The one or more projectors 222 may be configured to project visual content on one or more windows of the vehicle. The one or more head-mounted displays may optionally be used by one or more occupants to view the visual content, as an alternative to the one or more display devices and/or the one or more projectors. While not depicted in FIG. 2, UI elements 216 may also include one or more user input devices, which may comprise one or more of a touchscreen, a keyboard, a trackpad, a microphone, a motion sensing camera, or other device configured to enable a user to interact with and manipulate data within vehicle computing system 202.

Non-transitory memory 206 further includes an ADAS module 212 that provides assistance to a driver of the vehicle, and a DMS module 240 and an OMS module 242 that monitor a vehicle operator and occupant(s), respectively. ADAS 212 and/or DMS 240 may detect specific states, attribute, and poses of the driver, and may notify the occupant using via one or more UI elements 216. As one example, ADAS module 212 may interface with one or more UI elements 216 to output an alert via display devices 220 and/or speakers 214.

Vehicle computing system 202 may include an onboard navigation system 244. Onboard navigation system 244 may provide route information to the driver, including a current location of the vehicle and a destination of the vehicle. For example, when operating the vehicle, the driver may enter a destination into onboard navigation system 244. Onboard navigation system 244 may indicate one or more routes from the current location to the destination on a map displayed by onboard navigation system 244. In various embodiments, the map may be displayed on a screen of a display of onboard navigation system 244, such as a dashboard display. The driver may select a route of the one or more routes, and onboard navigation system 244 may provide instructions to the driver and/or indicate a progress of the vehicle towards the destination on the map. Onboard navigation system 244 may additionally calculate information such as an estimated distance to the destination, an estimated time of arrival at the destination based on a speed of the vehicle, indications of traffic on the route, and/or other information of use to the driver.

Onboard navigation system 244 may rely on a global positioning system (GPS) to determine the current location of the vehicle. In various embodiments, the current location, route, and/or other GPS-based information may be used by one or more ML models of AR module 210 to identify elements of a surrounding environment of the vehicle.

Vehicle computing system 202 may include a communication module 250, which may manage wireless communication between vehicle computing system 202 and one or more wireless network 260. In various embodiments, wireless network 260 may include the Internet. The wireless communication managed by communication module 250 may include, for example, retrieving information available on the Internet about elements of images captured by external cameras 119. Additionally, wireless network 260 may include one or more private networks. For example, communication module 250 may be used to send images collected by external cameras 119 to a cloud-based database 262 for processing via a private network. In some embodiments, the images may be used as training data to train one or more ML models of AI module 211, for example, to classify elements in the images as high-priority or low-priority elements, and/or to train one or more ML models of AR module 210, for example, to identify elements in the images, retrieve data about the identified elements, and/or selectively display the retrieved data to passengers of the vehicle, as described in greater detail below.

It should be understood that vehicle computing system 202 shown in FIG. 2 is for illustration, not for limitation. Another appropriate vehicle computing system may include more, fewer, or different components.

Figure 3:
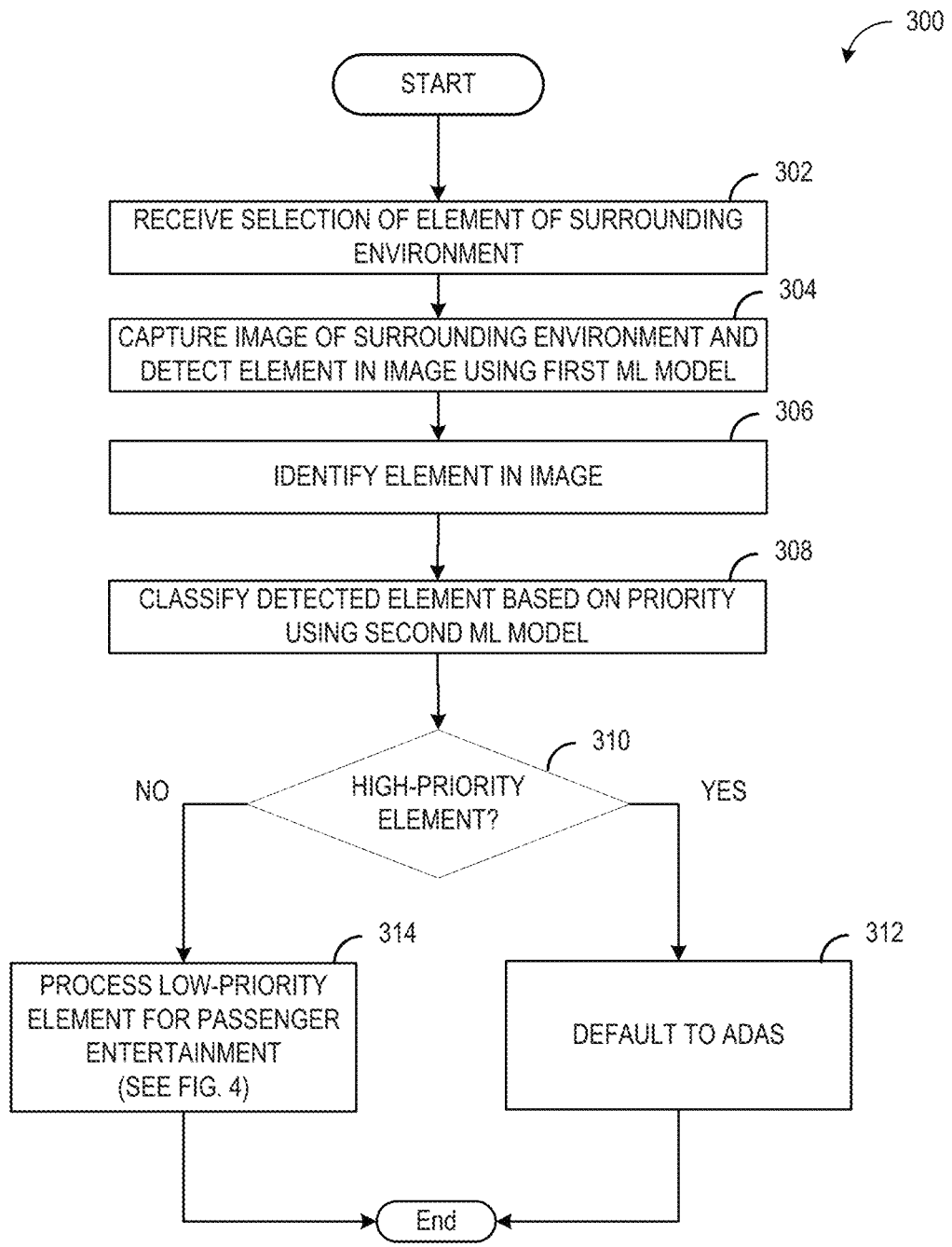
FIG. 3 is a flowchart illustrating an exemplary high-level method for processing visual data captured by one or more cameras of a vehicle, according to one or more embodiments of the disclosure.

Referring now to FIG. 3, a method 300 is shown for processing image data captured by one or more cameras of a vehicle, such as external cameras 119 of vehicle 100 of FIG. 1. In particular, method 300 may be used to determine relevant actions to be taken by a computing system of the vehicle (e.g., computing system 120 and/or vehicle computing system 202 of FIG. 2) while the vehicle is moving based on whether elements (e.g., objects) of a surrounding environment of the vehicle are high-priority elements or low-priority elements. For the purposes of this disclosure, the high-priority elements may include visual elements of the surrounding environment that may be relevant to an operation of the vehicle by a driver of the vehicle, or a safety of the vehicle. In contrast, the low-priority elements may include visual elements of the surrounding environment that are not relevant to the operation of the vehicle or the safety of the vehicle. For example, the low-priority elements may include natural or man-made landmarks of the surrounding environment that may be of interest to passengers of the vehicle. Method 300 may be performed by a processor of the computing system, such as processor 204 of FIG. 2, based on instructions stored in an AI module of non-transitory memory of the computing system, such as AI module 211.

Method 300 begins at 302, where method 300 includes receiving a selection of an element of a surrounding environment of the vehicle. In various embodiments, the element may be selected by an occupant (e.g., a passenger) of the vehicle via an AR touchscreen window, as described above. For example, the occupant may touch a location on the AR touchscreen window at which the element is visible through the AR touchscreen window, and the computing system may map the location to the element of a surrounding environment. In one embodiment, the computing system may estimate a position of eyes of the occupant based on a weight and/or size of the occupant determined using one or more seat sensors, such as passenger seat sensors 126 and 128 of vehicle 100 of FIG. 1 (e.g., weight sensors, seat position/height sensors, etc.). The computing system may plot a trajectory between the estimated position of the eyes of the occupant and the location on the AR touchscreen window, and may determine the selected element based on the trajectory. For example, the computing system may use triangulation to determine an intersection between the trajectory and a camera angle of a camera of the vehicle. In other examples, a different method may be used to determine the selected element.

At 304, method 300 includes capturing an image of the surrounding environment of the vehicle including the selected element, at a time when the element is selected by the occupant, and detecting the selected element in the image. The image may be captured by an external camera (e.g., cameras 119) of the vehicle. In some examples, images of the element may be captured by two or more different external cameras of the vehicle. For example, a first image of the element may be captured by a first external camera mounted in a side mirror of the vehicle, and a second image of the same element may be captured by a front end camera of the vehicle. In such examples, a largest and/or most detailed of the first image and the second image may be selected. In other examples, an image captured by a camera closest to the occupant may be selected. In various embodiments, the selected element may be referenced by a locational pointer, bounding box, or different graphical element that indicates a position of the selected element within the image.

The selected element may be detected in the image using a first ML model. The first ML model and other ML models described herein may be stored in an AI module of the computing system (e.g., AI module 211 of FIG. 2). In various embodiments, the first ML model may include a convolutional neural network (CNN) comprising a plurality of layers, where low-level features of the image are detected at one or more layers of the plurality of layers, and the elements of the image are identified based on the detected low-level features in accordance with various techniques and methods known in the art. For example, the CNN may identify a building in the image, or a tree, or a bridge, etc. Further, in some embodiments, the computing system may display a prompt (e.g., a dialog box, etc.) on the AR touchscreen window, requesting that the occupant disambiguate between two or more elements positioned within a same region of the surrounding environment, from the perspective of the occupant.

At 306, method 300 includes identifying the selected element in the image. In some embodiments, the selected element may be identified by performing one or more Internet image searches on the selected element (e.g., after performing a segmentation of the image). GPS data may be also used to determine the selected element. For example, the GPS data may be used to identify candidates for the selected element, and images of the candidates may be retrieved from one or more local and/or online databases, and online reference sites, or Internet websites and compared to an image of the selected element.

At 308, method 300 includes classifying the detected element based on priority. In some embodiments, the detected element may be classified using a second ML model, which may be different than the first ML model. The second ML model may classify the detected element into one of two categories: a high-priority category, and a low-priority category. The high-priority category may include elements that represent a potential hazard to the vehicle, and/or elements that may be of use to the driver for making decisions while driving the vehicle. For example, elements of the high-priority category may include one or more vehicles present in the image, for example, a vehicle being operated in a same or adjacent lane of the vehicle in front of behind, or next to the vehicle; an obstacle detected on a road on which the vehicle is being operated; a traffic signal or warning light such as a railroad crossing in the image; and so on. Elements of the low-priority category may include objects in the surrounding environment that are not relevant to the operation of the vehicle. Elements of the low-priority category may include architectural elements of interest such as buildings or bridges; monuments, statues, or other man-made artistic representations; natural and/or geographic features such as trees, mountains, rivers, oceans, lakes, etc.; and so on. The second ML model may provide a confidence score that the detected element is in the high-priority category.

In various embodiments, the second ML model may be a classification neural network (NN) trained on images including various examples of the high-priority elements and the low-priority elements. In some embodiments, the examples may be collected from external cameras of a plurality of vehicles as the vehicles are operated in different environments, and transmitted wirelessly to a cloud-based storage for incorporation into one or more training, test, and/or validation sets of data. The training sets may then be used to train the second ML model. After training, the second ML model may receive as input an image including a detected element, and output a classification of the detected element as either a high priority element or a low-priority element.

At 310, method 300 includes determining, for each detected element in the image, whether the detected element is a high-priority element. For example, if a confidence score of the detected element being a high-priority element outputted by the second ML model is above a threshold confidence score, the detected element may be determined to be a high-priority element.

If at 310 a detected element is determined to be a high-priority element, method 300 proceeds to 312. At 312, method 300 includes defaulting to an ADAS system of the vehicle to process the detected element. In other words, the ADAS system may be configured to alert or notify the driver in regard to high-priority elements captured by the one or more cameras, and no separate action may be taken by the computing system in regard to the high-priority elements.

Alternatively, if at 310 a detected element is determined to be a low-priority element (e.g., a non-high-priority element), method 300 proceeds to 314. At 314, 300 includes processing the low-priority element for passenger education and/or entertainment. Processing the low-priority element for passenger education and/or entertainment may include generating and displaying information relating to the low-priority element to one or more passengers of the vehicle. The processing of the low priority elements is described in greater detail below in reference to FIG. 4.

Figure 4:
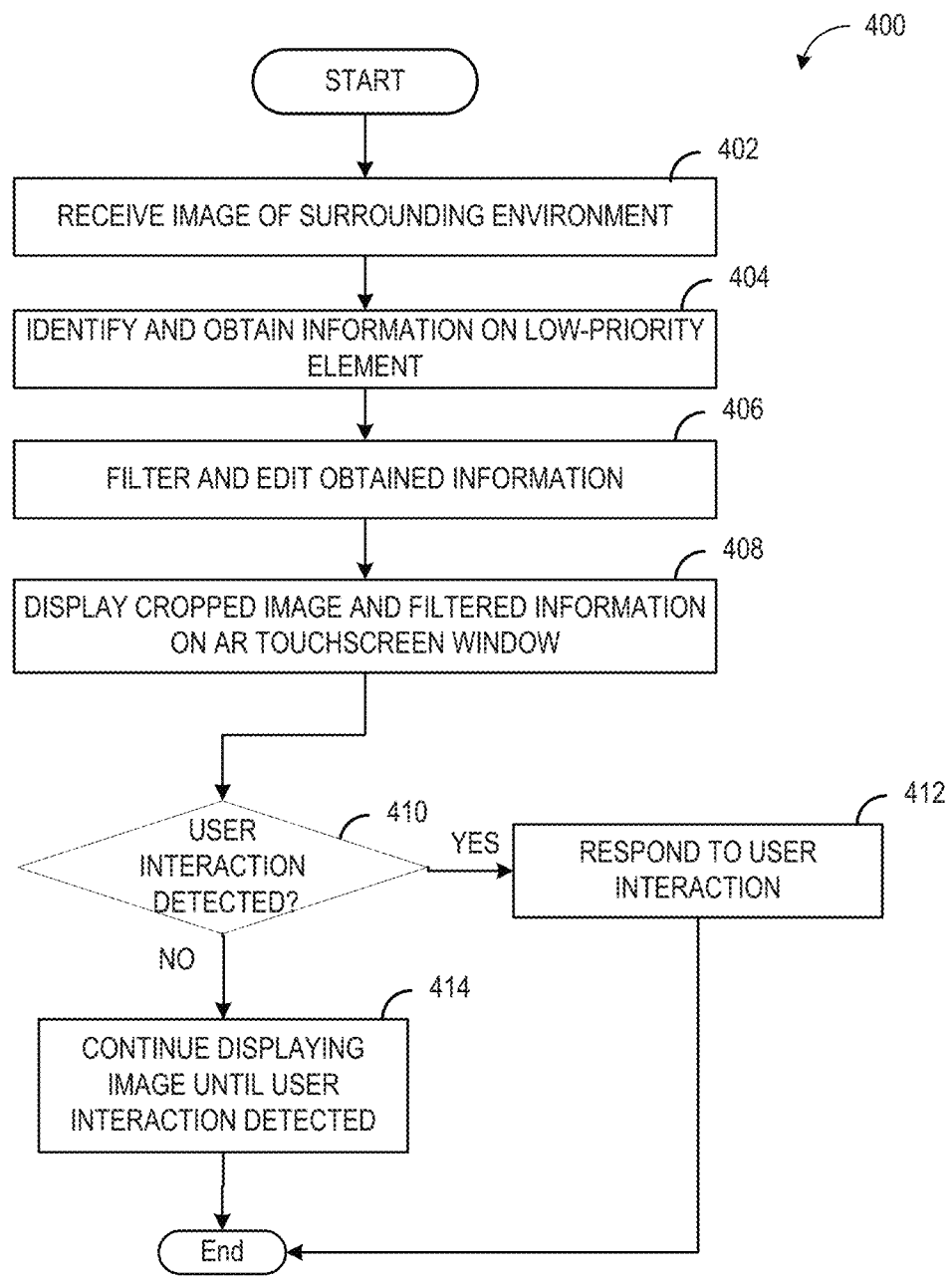
FIG. 4 is a flowchart illustrating an exemplary method for displaying data related to a surrounding environment captured by one or more cameras of a vehicle on a window of the vehicle, according to one or more embodiments of the disclosure.

Referring now to FIG. 4, a method 400 is shown for processing a low-priority element detected in image data captured by one or more cameras of a vehicle, such as external cameras 119 of vehicle 100 of FIG. 1. In various embodiments, the low-priority element may be detected by a computing system of the vehicle, such as computing system 202 of FIG. 2, in accordance with method 300 described above. The low-priority element may be processed to generate and display filtered, relevant information of the low-priority element to one or more passengers of the vehicle, for educational and/or entertainment purposes. Method 400 may be performed by a processor of the computing system, such as processor 204 of FIG. 2, based on instructions stored in an AR module of non-transitory memory of the computing system, such as AR module 210.

Method 400 begins at 402, where method 400 includes receiving an image of the selected low-priority element within a surrounding environment of the vehicle from an AI module of the computing system (e.g., AI module 211 of FIG. 2). One or more ML models of the AI module may have detected a low-priority element in the image, as described above. In response to detecting the low-priority element, the image may be transferred to one or more ML models of the AR module, which may process the image for the educational and/or entertainment purposes.

At 404, method 400 includes identifying and obtaining information on the detected low-priority element included the image. Identifying the low-priority element may include cross-referencing the low-priority element with one or more local and/or online databases accessed via a wireless network (e.g., wireless network 260 of FIG. 2). For example, the low-priority element may be identified partially based on a current location of the vehicle based on GPS data retrieved from an onboard navigation system of the vehicle (e.g., onboard navigation system 244). For example, the GPS data may be used to reference a first online database of buildings corresponding to addresses at the current location of the vehicle, to determine a match with a building in the surrounding environment. Alternatively, the GPS data may be used to reference a second online database of geographical features near the current location.

Additionally or alternatively, identifying the low-priority element may include segmenting the element in the image, and matching the segmented element with similar images in the one or more local and/or online databases, reference sites, and/or websites on the Internet. For example, an iconic building may be matched with images of the iconic building on websites (e.g., tourism or architectural websites), or a well-known mountain may be matched with images of the mountain found on the websites. Template-matching searches may be conducted of relevant databases.

Once the element has been identified, one or more identifiers of the element may be retrieved from the local and/or online databases and/or reference sites, and the one or more identifiers may be used to perform one or more searches for information on the element. In various embodiments, obtaining the information on the detected low-priority element included the image may include performing one or more online searches in series. A first search may be performed to retrieve a first set of information; elements of the first set of information may be used to perform a second search to retrieve a second set of information; elements of the second set of information may be used to perform a third search to retrieve a third set of information; and so on.

An amount of information to be retrieved may be determined by one or more AI models of the AR module. In some embodiments, the amount of information to be retrieved may be determined by a rules-based model, based on a type of visual element and/or other criteria. For example, if a building is identified as a museum, the information retrieved about the museum may include current or permanent exhibits of the museum, hours of the museum, and a cost of visiting the museum. If the building is identified as an historic or iconic building, the information retrieved about the building may include an architect of the building, a summary of a history of the museum, and an address of the building.

In some embodiments, obtaining the information on the low-priority element may include searching for and downloading images of the low-priority element captured from other camera angles. For example, the low-priority element may be a mountain, where images of the mountain taken from various sides, faces, and/or perspectives of the mountain may be found on the Internet. The images may be downloaded, such that if a passenger wishes to view the mountain from a different side, the passenger may use a touchscreen of the AR touchscreen window to rotate the mountain and view one or more of the images of the mountain taken from various sides, faces, and/or perspectives, as described below in reference to FIG. 7.

At 406, method 400 includes filtering and editing the obtained information. The obtained information may include an amount of text that is too large to display effectively on the AR touchscreen window next to an image of the element, and the amount of text may be reduced to a desired amount. For example, the element may be a museum that the vehicle is passing by. The one or more AI models and/or rules based model may obtain a name and a description of the museum from an online tourism website. The one or more AI models and/or rules based model may use the name to search for a website of the museum. The one or more AI models and/or rules based model may retrieve hours of the museum from a first page of the museum website. The one or more AI models and/or rules based model may retrieve a paragraph describing current exhibits of the museum from a second page of the museum website.

The name, description, hours, and paragraph describing the current exhibits of the museum may include too much text to display clearly next to a cropped image of the selected element on the AR touchscreen window. As a result, the one or more AI models and/or rules based model may reformat the text to include a bulleted list, where the bulleted list includes a minimum number words. Additionally, the paragraph may be edited to reduce a length of the content of the paragraph to one or two sentences, or in some cases, a caption.

At 408, the method includes displaying the image and the edited information on the AR touchscreen window. Displaying the image and the edited information on the AR touchscreen window may include generating a cropped image of the selected element, and resizing the cropped image for display on the AR touchscreen window. In various embodiments, a portion of the AR touchscreen window may be allocated for displaying the selected element. For example, the portion of the AR touchscreen window may comprise an area of the AR touchscreen window corresponding to approximately 10% of a total area of the AR touchscreen window, located in a lower right-hand corner of the AR touchscreen window. It should be appreciated that the examples provided herein are for illustrative purposes, and in other embodiments, the portion may comprise an area of the AR touchscreen window of a greater or lesser size, which may be positioned in different positions within the AR touchscreen window.

Referring briefly to FIG. 5, an exemplary side window 500 of a vehicle such as vehicle 100 of FIG. 1 is shown. Side window 500 is an AR touchscreen window, as described above in reference to FIG. 4. Through side window 500, a surrounding environment 504 is visible by a passenger sitting in a passenger seat of the vehicle. For example, the passenger seat may be a rear, right passenger seat of the vehicle. The vehicle is being driven by a driver in a direction indicated by an arrow 520, such that elements of surrounding environment 504 may enter into view at a first side 510 of side window 500, and disappear from view at a second side 512 of side window 500. In surrounding environment 504, the passenger may view an element 502 of interest. In FIG. 5, element 502 may be a historic church. The passenger may be interested in learning more about the church when it passes into view. To learn more about the church, the passenger may touch side window 500 at a point 506 to select element 502, as indicated by a hand icon 508. When the passenger touches side window 500, the touch may be detected by a touchscreen of side window 500, which may indicate to the computing system of the vehicle (e.g., computing system 120 and/or vehicle computing system 202) that the passenger has selected element 502. The computing system may identify the church as element 502, for example, by comparing an estimated line of sight of the passenger from a position of the passenger's eyes through point 506 on side window 500 with a camera angle of an exterior camera of the vehicle (e.g., a camera 119). In some embodiments, a GPS system of an onboard navigation system (e.g. onboard navigation system 244) may be used to aid in identifying selected element 502. A cropped and expanded image of element 502 may then be displayed in side window 500, as shown in FIG. 6.

FIG. 6 shows a cropped and expanded image 600 of element 502 displayed in side window 500 of FIG. 5, in response to the passenger selecting element 502 in surrounding environment 504. When cropped and expanded image 600 is displayed on side window 500, surrounding environment 504 of FIG. 5 including the church may no longer be visible, and may be replaced by a surrounding environment 604 not including the church. In other words, element 502 may have disappeared from view via side window 500, and surrounding environment 604 may include different elements. For example, surrounding environment 604 does not include element 502, but includes an element 620 (e.g., a house).

Cropped and expanded image 600 is depicted with a width 607 and a height 606. In the depicted embodiment, width 607 is approximately ⅙ of a total width 608 of side window 500, and height 606 is just under one half of a total height 610 of side window 500. Thus, cropped and expanded image 600 occupies a relatively small portion of side window 500, such that a majority of surrounding environment 604 may be viewed through side window 500 without being obscured by cropped and expanded image 600. Additionally, while not depicted in FIG. 6, in some embodiments, cropped and expanded image 600 the partially transparent, and some elements of surrounding environment 604 may be viewed behind cropped and expanded image 600. In other embodiments, width 607, height 606, and a corresponding size of cropped and expanded image 600 may be greater or lesser than depicted in FIG. 6, and/or may occupy a greater or lesser percentage of a total area of side window 500.

Further, information, such as textual information, may be superimposed on cropped and expanded image 600, as described above. In FIG. 6, a caption 630 indicates that the object included in cropped and expanded image 600 is a historic church. In other embodiments, different and/or additional information may be displayed superimposed on cropped and expanded image 600. The different and/or additional information may be displayed, for example, as a bulleted or itemized list, in a paragraph, in a series of sentences, or in a different manner. For example, the different and/or additional information may include historical facts of the church, or other information. The information may be include above, below, to a side of the church, or in the middle of the church. In some embodiments, if a size of the different and/or additional information is larger than cropped and expanded image 600, the different and/or additional information may be displayed in a scrollable view, where the user may scroll up or down using a finger to view different portions of the different and/or additional information.

In various embodiments, an intensity or other property or properties/characteristics of the image may be adjusted to make it easier to read information displayed on cropped and expanded image 600. Additionally, color may be used to increase a contrast between the information and the cropped and expanded image 600. For example, the information may be displayed in one or more colors, and/or color properties of cropped and expanded image 600 may be adjusted.

Returning to FIG. 4, at 410, method 400 includes determining whether a user interaction with the AR touchscreen window has been detected. After the cropped and expanded image is displayed on the AR touchscreen window, the passenger may interact with the cropped and expanded image in various ways, for example, with a finger (e.g., swiping, selecting, double-tapping, etc.). If at 410 a user interaction is detected, method 400 proceeds to 412. At 412, the method includes responding to the user interaction accordingly with various predetermined actions, as described below in reference to FIG. 7.

Alternatively, if at 410 no user interaction is detected, the method proceeds to 414. At 414, the method includes continuing to display the cropped and expanded image in the AR touchscreen window until a user interaction is detected. For example, the passenger may perform a user interaction to dismiss (e.g., stop displaying) the cropped and expanded image. Method 400 ends.

FIG. 7 shows a number of interactions 700 that may be performed on cropped and expanded image 600 of element 502, as depicted by various hand icons. Each of the interactions may be associated with a different predetermined action or operation of the computing system. The passenger may swipe right on cropped and expanded image 600, as indicated by hand icon 702, or swipe left on cropped and expanded image 600, as indicated by hand icon 706. The passenger may tap or double tap on cropped and expanded image 600, as indicated by hand icon 708. The passenger may tap cropped and expanded image 600 with two fingers, as indicated by hand icon 704. The passenger may rotate cropped and expanded image 600 to view images of element 502 from other viewpoints (e.g., to achieve a 360 degree view of element 502 by sliding a finger across cropped and expanded image 600, as shown by hand icon 710. The images of element 502 from other viewpoints may be downloaded from the Internet.

In other embodiments, a greater or lesser number of user interactions may be supported. Additionally, it should be appreciated that the examples provided herein are for illustrative purposes, and different functionalities may be provided using the interactions described above or different interactions without departing from the scope of this disclosure.

Each of the interactions 700 depicted in FIG. 7 may be mapped to different operations or actions performed by the computing system of the vehicle. For example, tapping on cropped and expanded image 600 (or touching and holding for a predetermined length of time) may open a menu or wizard that allows the passenger to select from a number of options, such as saving, deleting, and/or sharing the image, annotating the image, obtaining more information about the image, etc. Other user interactions may provide shortcuts to the menu or wizard. For example, in one embodiment, swiping left on cropped and expanded image 600 may dismiss (e.g., remove) cropped and expanded image 600 from side window 500, such that cropped and expanded image 600 is no longer displayed in or on side window 500. Double-tapping on cropped and expanded image 600 may open an Internet browser with a search page pre-populated with search result information about element 502. For example, a name of element 502 determined during an identification of element 502 as described above in reference to method 400 may be used to perform the Internet search. The Internet browser may be displayed superimposed on cropped and expanded image 600, or on a different portion of side window 500. The user may adjust a size of the Internet browser, for example, by dragging a corner of the Internet browser.

As another example, tapping cropped and expanded image 600 with two fingers may display a virtual keypad, from which the passenger can type in information, add images from a photo album stored in a smart phone or vehicle, record an audio clip, or associate other media with cropped and expanded image 600. For example, element 502 (e.g., the church) may remind the passenger of a different church encountered on the journey. The passenger may tap cropped and expanded image 600 with two fingers to pop up the virtual keypad. The passenger may use the virtual keypad to type in a short note referencing the different church, or search for a different photo of the church or the different church using the Internet browser. When the passenger types in information or adds the different photo, this gets tagged to element 502 (e.g., the point of interest (POI) object). After addition, the passenger can view the added information and/or different photo in cropped and expanded image 600. All the information, whether fetched from the Internet by the system or added by the passenger, may be visible in cropped and expanded image 600 and/or viewable by scrolling.

As another example, swiping right on cropped and expanded image 600 may pop up a dialog box 720 on side window 500 that may allow the passenger to request to share cropped and expanded image 600 with one or more other passengers of the vehicle. For example, dialog box 720 may prompt the passenger to select one or more other passengers of the vehicle from a list, to whom the cropped and expanded image would be shared. The one or more other passengers may be referenced in the dialog box by a seat position, as shown in FIG. 7. For example, for a vehicle with four seats, options for a front left passenger, a rear left passenger, and rear right passenger may be provided in dialog box 720. A seat option of the passenger sharing information may be deselected. When the passenger selects the one or more passengers and selects a submit button of the dialog box, one or more corresponding requests may be sent to the one or more passengers indicating that the passenger wishes to share an image. The requests may be displayed in corresponding dialog boxes displayed on corresponding AR touchscreen windows of the one or more passengers. If a passenger of the one or more passengers accepts the request, the cropped and expanded image may be displayed on the AR touchscreen window of the accepting passenger. The cropped and expanded image may continue to be displayed on the sending passenger's AR touchscreen window, until dismissed by the sending passenger.

Alternatively, in some embodiments, the passenger may share cropped and expanded image 600 and associated mixed-media content with friends or family via email, using a wireless network of the vehicle. For example, dialog box 720 may include an option to create an email, and type in an email address using the virtual keyboard. The computing system may send cropped and expanded image 600 and the associated mixed-media content to the email address, via a communication module with a wireless network (e.g., communication module 250 and wireless network 260 of FIG. 2).

In various embodiments, the passenger may interact with the AR touchscreen window to create a travel journal documenting places the passenger visited during a journey, including images of elements of interest encountered in the surrounding environment along the journey. For example, the travel journal may be a map-based representation of the journey, where a route driven by the vehicle is stored by the computing system, and links to the images are shown (e.g., tagged) on the map. The passenger may select one of the links, and one or more annotated images may be displayed corresponding to a location on the route where the image was taken. In some examples, the passenger may select "Start a travel journal" from the menu to create a new travel journal, and select "End travel journal" to stop saving images to the travel journal. The computing system may store the map-based journal in a cloud-based storage (e.g., cloud-based database 262), and the passenger may download the map-based journal for viewing on a smart phone, tablet, personal computer, etc. Additionally or alternatively, the passenger may create a travel planner for future travel, where images and text are associated with places the passenger may wish to visit in the future.

As described above, the images may be annotated with text such as notes, thoughts, reflections, memories, etc. Further, other types of media may be associated with the images, such as sound files (e.g., voice commentary, music, etc.), video files (e.g., video clips taken with a smart phone or downloaded from the Internet via the smart phone or the computing system of the vehicle), or other types of files. For example, the in-vehicle AR system (e.g., in-vehicle AR system 208 of FIG. 2) may be configured to receive voice commands, where various functionalities described above may be performed via a pre-defined command (e.g., "add note", "open browser", etc.).

Thus, systems and methods are provided that allow passengers of a vehicle may interact with a surrounding environment in an entertaining and educational manner, which may reduce boredom particularly during long journeys or heavy congestion. Elements of the surrounding environment can be explored in a comfortable and self-directed manner, in which customized information may be obtained from the Internet and/or other online or local sources based on a passenger's specific interests. A passenger may capture images of elements of the surrounding environment, annotate the images with text, sound, video, and/or other images to create mixed media content, and share the mixed media content with other passengers or friends over the Internet. For example, school children on an educational excursion can be engaged in a fun way, can share knowledge gained during a trip, and can access the knowledge later. The passenger can plan future trips, and save the plans in a customized travel planner in a cloud to be followed at a later time. Passengers of all ages can document their trips in multimedia travel journals or albums, saving images and information collected along the journeys for reviewing and/or sharing later.

The technical effect of allowing passengers to select and capture images of a surrounding environment, and annotate, save, and share the selected images is that the passengers can have access to real-time information about the areas in which they travel that is responsive to their input in an augmented reality environment.

The disclosure also provides support for a method for a computing system of a vehicle, the method comprising: in response to a passenger of the vehicle selecting an element of a surrounding environment of the vehicle, the element visible through a window of the vehicle by the passenger: capturing a first image of the surrounding environment including the element via one or more cameras of the vehicle, detecting and identifying the element of the first image, retrieving information about the element from the Internet, and displaying a second image of the element and the retrieved information about the element on the window. In a first example of the method, the one or more cameras of the vehicle include at least a front end camera, a rear end camera, a first side camera mounted on a right side of the vehicle, and a second side camera mounted on a left side of the vehicle. In a second example of the method, optionally including the first example, the element is selected by the passenger via a touchscreen portion of an AR touchscreen window. In a third example of the method, optionally including one or both of the first and second examples, detecting the element of the first image further comprises comparing an estimated line of sight of the passenger from a position of the passenger's eyes through a selected location of the AR touchscreen window with a camera angle of a camera of the one or more cameras of the vehicle. In a fourth example of the method, optionally including one or more or each of the first through third examples, identifying the element of the first image further comprises determining a location of the element within the surrounding environment using a global positioning system (GPS) of the vehicle. In a fifth example of the method, optionally including one or more or each of the first through fourth examples, identifying the element of the first image further comprises: segmenting the element within the first image, and matching the segmented element with one or more images of the element retrieved from one or more local and/or online databases, and online reference sites, or Internet websites. In a sixth example of the method, optionally including one or more or each of the first through fifth examples, retrieving information about the element from the Internet further comprises retrieving one or more identifiers of the element from the one or more local and/or online databases, reference sites, and Internet websites, and performing one or more searches in the one or more local and/or online databases, reference sites, and Internet websites for information on the element using the one or more identifiers. In a seventh example of the method, optionally including one or more or each of the first through sixth examples, the method further comprises: performing a first search to retrieve a first set of information, and performing a second search based on elements of the first set of information to retrieve a second set of information. In an eighth example of the method, optionally including one or more or each of the first through seventh examples, displaying the second image of the element and the retrieved information about the element on the window further comprises displaying the second image in a portion of the AR touchscreen window. In a ninth example of the method, optionally including one or more or each of the first through eighth examples, the method further comprises: performing an operation on the second image in response to the passenger performing a user interaction with the second image via the AR touchscreen window, the user interaction one of: double tapping the second image, swiping the second image in a first direction, swiping the second image in a second direction, touching the second image with two fingers, and sliding a finger of the passenger across the second image. In a tenth example of the method, optionally including one or more or each of the first through ninth examples, the method further comprises: in response to the user interaction, displaying an Internet browser window with information about the element on the AR touchscreen window. In an eleventh example of the method, optionally including one or more or each of the first through tenth examples, the method further comprises: in response to the user interaction, dismissing the image. In a twelfth example of the method, optionally including one or more or each of the first through eleventh examples, the method further comprises: in response to the user interaction, displaying a graphical element allowing the passenger to send the image to one or more other passengers of the vehicle. In a thirteenth example of the method, optionally including one or more or each of the first through twelfth examples, the method further comprises: in response to the user interaction, displaying one or more graphical elements on the AR touchscreen window allowing the passenger to enter in information and/or images stored on a smart phone and/or stored in the computing system.

The system may also take into account the vehicle speed relative to the environment and objects being detected and identified, particularly with regard to the augmented reality experience. Because the vehicle may operate at a wide range of speeds, an occupant's focus in the field of view may vary in terms of distance from the vehicle out toward a horizon, such as a horizon out a side window of the vehicle. The system can thus take advantage of the vehicle speed as an additional input in determining the object, identifying the object, and/or as to the type and quantity and location of information provided based thereon.

In an example, wherein identifying the element of the first image further comprises comparing an estimated line of sight of the passenger from a position of the passenger's eyes through a selected location of the AR touchscreen window with a camera angle of a camera of the one or more cameras of the vehicle, the identifying may take into account the vehicle speed if the object is stationary. For example, at higher vehicle speeds, a line of sight may be adjusted to be further toward a horizon, and vice versa, such as by using a look-up table with an adjustment factor based on vehicle speed. As another example, where identifying the element of the first image further comprises determining a location of the element within the surrounding environment using a global positioning system (GPS) of the vehicle, the identifying may further be based on vehicle speed. For example, at higher vehicle speeds, the location may be determined to be further toward a horizon, and vice versa, again using an adjustment factor in a look-up table based on vehicle speed. The look-up tables may be calibrated based on vehicle testing.

In still another example wherein retrieving information about the element from the Internet, the retrieval may also be based on vehicle speed. For example, the quantity of information reduced may be reduced as vehicle speed increases. Thus, at higher vehicle speeds, the information may be contracted. As another example, the retrieved information may be summarized to a greater extent for higher vehicle speeds. The amount of summarization may be proportional to the vehicle speed.

In an example, where the method includes performing a first search to retrieve a first set of information; and performing a second search based on elements of the first set of information to retrieve a second set of information, one or both of the first and second searches may also be based on vehicle speed. For example, the type of information may be adjusted for different vehicle speeds. At low vehicle speeds, not only can more information be retrieved (and displayed), but also information at low speeds may be adjusted to focus on facts and figures, whereas at high vehicle speeds pictoral information is received and displayed. The first and second searches may thus be based on vehicle speed and tailored to search different aspects (for one of or both of the first and second search) depending on the vehicle speed.

In an example wherein displaying the second image of the element and the retrieved information about the element on the window further comprises displaying the second image in a portion of the AR touchscreen window, the display may be based on vehicle speed as noted above. At higher vehicle speeds, the second image may be displayed to be further away from the vehicle, as an occupant may naturally gaze further from the vehicle as speed increases. The adjustment in terms of the degree of how much further away can be proportional to vehicle speed. As another example, as noted above, the type of image provided may change with vehicle speed, where text based images are provided at lower speeds and pictoral images are provided at higher speeds.

The disclosure also provides support for a computing system for a vehicle, the computing system comprising: an in-vehicle AR system, a processor, and a non-transitory memory storing instructions that when executed, cause the processor to: in response to a passenger of the vehicle selecting an element of a surrounding environment of the vehicle in an AR touchscreen window of the vehicle coupled to the computing system, the element visible through the AR touchscreen window: capture a first image of the surrounding environment including the element via one or more cameras of the vehicle, detect and identify the element of the first image, retrieve information about the element from the Internet, and display a second image of the element and the retrieved information about the element on a portion of the aR touchscreen window. In a first example of the system, further instructions are stored in the non-transitory memory that when executed, cause the processor to perform an operation on the second image in response to the passenger performing a user interaction with the second image via the AR touchscreen window, the user interaction one of: double tapping the second image, swiping the second image in a first direction, swiping the second image in a second direction, touching the second image with two fingers, and sliding a finger of the passenger across the second image. In a second example of the system, optionally including the first example, the operation is one of: displaying an Internet browser window with information about the element on the AR touchscreen window, displaying a dialog box on the AR touchscreen window, displaying a virtual keyboard on the AR touchscreen window, rotating the second image to achieve a 360 degree view of the element, annotating the second image with text, images, audio, video, or a different type of content selected by the passenger via one of a microphone, the dialog box, and the virtual keyboard, sharing the second image or an annotated second image with a different passenger of the vehicle, storing the second image or the annotated second image in a travel journal or travel planner of the passenger stored in a cloud-based storage, and dismissing the second image or the annotated second image from the AR touchscreen window. In a third example of the system, optionally including one or both of the first and second examples, the travel journal or travel planner includes a map-based interface, where a link to the second image or the annotated second image is included on a route driven by the vehicle, and the second image or the annotated second image is displayed upon a user selecting the link.

The disclosure also provides support for a method for a computing system of a vehicle, the method comprising: while the vehicle is being operated on a route: displaying an image of an element of a surrounding environment of the vehicle visible through an AR touchscreen window of the vehicle positioned next to a passenger of the vehicle, in response to the passenger selecting the element via a touchscreen of the aR touchscreen window, retrieving information from the Internet about the element, and displaying the information superimposed on the image, and in response to the passenger interacting with the image via the touchscreen, using a finger of the passenger, performing one of: displaying an Internet browser window with search results about the element on the AR touchscreen window, displaying text, images, audio, video, or a different type of content inputted by the passenger on the AR touchscreen window, sharing the image with a different passenger of the vehicle, the different passenger selected by the passenger, rotating the image to achieve a 360 degree view of the element, and dismissing the image from the AR touchscreen window. In a first example of the method, the method further comprises: storing the image within an interactive map-based representation of a journey of the passenger.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information enhancement described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for a computing system of a vehicle, the method comprising:
in response to a passenger of the vehicle selecting an element of a surrounding environment of the vehicle, the element visible through an augmented reality (AR) touchscreen window of the vehicle by the passenger while the vehicle is moving:
capturing a first image of the surrounding environment including the element via one or more cameras of the vehicle;
identifying the element of the first image using one or more machine learning (ML) models;
retrieving information about the element from the Internet; and
displaying a second image of the element and the retrieved information about the element on the AR touchscreen window;
wherein the element is selected by the passenger by touching a location of the element on the AR touchscreen window; and
wherein identifying the element of the first image further comprises plotting a trajectory between an estimated position of eyes of the passenger and the selected location of the AR touchscreen window, and using triangulation to determine an intersection between the trajectory and a camera angle of a camera of the one or more cameras of the vehicle.

2. The method of claim 1, wherein the one or more cameras of the vehicle include at least a front end camera, a rear end camera, a first side camera mounted on a right side of the vehicle, and a second side camera mounted on a left side of the vehicle.

3. The method of claim 1, wherein the passenger selects a city landmark visible through the AR touchscreen window while the vehicle is driving through an urban environment by touching a location of the element on the AR touchscreen window, the city landmark is identified in images captured by the one or more cameras based on the location on the AR touchscreen window using the one or more ML models, and an image of the city landmark is extracted from the images and displayed on a portion of the AR touchscreen window.

4. The method of claim 1, wherein identifying the element of the first image further comprises:
segmenting the element within the first image; and
matching the segmented element with one or more images of the element retrieved from one or more local and/or online databases, and online reference sites, or Internet websites.

5. The method of claim 4, wherein retrieving information about the element from the Internet further comprises retrieving one or more identifiers of the element from the one or more local and/or online databases, reference sites, and Internet websites, and performing one or more searches in the one or more local and/or online databases, reference sites, and Internet websites for information on the element using the one or more identifiers.

6. The method of claim 5, further comprising performing a first search to retrieve a first set of information; and performing a second search based on elements of the first set of information to retrieve a second set of information.

7. The method of claim 1, wherein displaying the second image of the element and the retrieved information about the element on the window further comprises displaying the second image in a portion of the AR touchscreen window.

8. The method of claim 7, further comprising performing an operation on the second image in response to the passenger performing a user interaction with the second image via the AR touchscreen window, the user interaction one of:
double tapping the second image;
swiping the second image in a first direction;
swiping the second image in a second direction;
touching the second image with two fingers; and
sliding a finger of the passenger across the second image.

9. The method of claim 8, further comprising, in response to the user interaction, displaying an Internet browser window with information about the element on the AR touchscreen window.

10. The method of claim 8, further comprising, in response to the user interaction, dismissing the image.

11. The method of claim 8, further comprising, in response to the user interaction, displaying a graphical element allowing the passenger to send the image to a second AR touchscreen window of one or more other passengers of the vehicle.

12. The method of claim 8, further comprising, in response to the user interaction, displaying one or more graphical elements on the AR touchscreen window allowing the passenger to enter in information and/or images stored on a smart phone and/or stored in the computing system.

13. The method of claim 1, further comprising performing an operation on the second image in response to the passenger performing a user interaction with the second image via the AR touchscreen window, the operation including opening a menu or wizard that allows the passenger to select from options including saving, deleting, sharing, or annotating the second image.

14. A computing system for a vehicle, the computing system comprising:
an in-vehicle augmented reality (AR) system;
a processor; and
a non-transitory memory storing instructions that when executed, cause the processor to:
in response to a passenger of the vehicle selecting an element of a surrounding environment of the vehicle by touching a location of the element on an AR touchscreen window of the vehicle coupled to the computing system, the element visible through the AR touchscreen window while the vehicle is moving:
capture a first image of the surrounding environment including the element via one or more cameras of the vehicle;
plot a trajectory between an estimated position of eyes of the passenger and the location of the element on the AR touchscreen window;
detect and identify the element of the first image using triangulation to determine an intersection between the trajectory and a camera angle of a camera of the one or more cameras of the vehicle;
retrieve information about the element from the Internet; and display a second image of the element and the retrieved information about the element on a portion of the AR touchscreen window.

15. The computing system of claim 14, wherein further instructions are stored in the non-transitory memory that when executed, cause the processor to perform an operation on the second image in response to the passenger performing a user interaction with the second image via the AR touchscreen window, the operation including displaying an Internet browser with a search page pre-populated with search result information about the element superimposed on the second image on the AR touchscreen window.

16. The computing system of claim 15, wherein the operation includes:
rotating the second image to achieve a 360 degree view of the element.

17. The computing system of claim 15, wherein the operation includes storing the second image in a travel journal or travel planner of the passenger stored in a cloud-based storage, the travel journal or travel planner including a map-based interface, where a link to the second image or the annotated second image is included on a route driven by the vehicle, and the second image or the annotated second image is displayed upon a user selecting the link.

18. A method for a computing system of a vehicle, the method comprising:
while the vehicle is moving on a route:
displaying an image of an element of a surrounding environment of the vehicle visible through an augmented reality (AR) touchscreen window of the vehicle positioned next to a passenger of the vehicle, in response to the passenger selecting the element by touching a location of the element in the AR touchscreen window;
retrieving information from the Internet about the element, and displaying the information superimposed on the image; and
in response to the passenger interacting with the image via the touchscreen, using a finger of the passenger, performing one of:
displaying an Internet browser window with search results about the element on the AR touchscreen window;
displaying text, images, audio, video, or a different type of content inputted by the passenger on the AR touchscreen window;
sharing the image with a different passenger of the vehicle, the different passenger selected by the passenger;
rotating the image to achieve a 360 degree view of the element; and
dismissing the image from the AR touchscreen window;
wherein displaying the image of the element of the surrounding environment of the vehicle visible through an augmented reality (AR) touchscreen window of the vehicle positioned next to a passenger of the vehicle, in response to the passenger selecting the element by touching the location of the element in the AR touchscreen window further comprises plotting a trajectory between an estimated position of eyes of the passenger and the location of the element in the AR touchscreen window, and using triangulation to determine an intersection between the trajectory and a camera angle of a camera of one or more cameras of the vehicle.

19. The method of claim 18, further comprising storing the image within an interactive map-based representation of a journey of the passenger.

20. The method of claim 1, wherein the selected feature is determined by processing image data from the one or more cameras, and mapping the location to the element of a surrounding environment using one or more machine learning (ML) models of the AR system.

* * * * *